(12) United States Patent  (10) Patent No.: US 9,135,596 B2
Dunn  (45) Date of Patent: Sep. 15, 2015

(54) SYSTEM AND METHOD TO ALLOCATE RESOURCES IN SERVICE ORGANIZATIONS WITH NON-LINEAR WORKFLOWS

(75) Inventor: David A. Dunn, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 1648 days.

(21) Appl. No.: 12/392,587

(22) Filed: Feb. 25, 2009

(65) Prior Publication Data

US 2010/0218192 A1 Aug. 26, 2010

(51) Int. Cl.
*G06Q 10/00* (2012.01)
*H04M 3/523* (2006.01)
*G06F 9/50* (2006.01)
*G06Q 10/06* (2012.01)

(52) U.S. Cl.
CPC ........ *G06Q 10/0639* (2013.01); *G06Q 10/0631* (2013.01); *G06F 9/505* (2013.01); *G06F 9/5027* (2013.01)

(58) Field of Classification Search
CPC ................... G06Q 10/06312; G06Q 10/0631; G06Q 10/063116; G06Q 10/063118; H04M 3/5238; G06F 9/5027; G06F 9/505
USPC .......... 705/7.12, 7.16, 7.17, 7.22; 379/265.08
See application file for complete search history.

(56) References Cited

U.S. PATENT DOCUMENTS

| | | | |
|---|---|---|---|
| 6,044,146 A | 3/2000 | Gisby et al. | |
| 6,157,655 A | 12/2000 | Shtivelman | |
| 6,256,381 B1 * | 7/2001 | Donaghue, Jr. | 379/265.01 |
| 6,330,326 B1 * | 12/2001 | Whitt | 379/265.13 |
| 6,449,358 B1 | 9/2002 | Anisimov et al. | |
| 6,665,395 B1 * | 12/2003 | Busey et al. | 379/265.09 |
| 6,970,829 B1 * | 11/2005 | Leamon | 705/7.14 |
| 7,046,789 B1 * | 5/2006 | Anderson et al. | 379/265.01 |
| 7,873,156 B1 * | 1/2011 | Blair | 379/265.06 |
| 2001/0042032 A1 * | 11/2001 | Crawshaw et al. | 705/32 |
| 2002/0052770 A1 * | 5/2002 | Podrazhansky | 705/7 |
| 2002/0184069 A1 * | 12/2002 | Kosiba et al. | 705/8 |
| 2003/0043832 A1 | 3/2003 | Anisimov et al. | |
| 2003/0065548 A1 * | 4/2003 | Schmidt | 705/9 |
| 2005/0108775 A1 * | 5/2005 | Bachar et al. | 725/135 |
| 2005/0135601 A1 * | 6/2005 | Whitman | 379/266.08 |
| 2005/0165658 A1 * | 7/2005 | Hayes et al. | 705/26 |
| 2005/0187839 A1 * | 8/2005 | Butera et al. | 705/32 |
| 2006/0004540 A1 * | 1/2006 | Hamilton et al. | 702/176 |
| 2006/0010051 A1 * | 1/2006 | Sattler et al. | 705/32 |

(Continued)

OTHER PUBLICATIONS

Cotton, "Caller Acceptability of Network Interactions for Advanced Intelligent Network Services," 1991, ICC '91, pp. 1582-1585.*

(Continued)

*Primary Examiner* — Ivan R Goldberg
(74) *Attorney, Agent, or Firm* — Larson Newman, LLP

(57) ABSTRACT

A method can include determining a number of cases received (e.g., a case load), a number of cases processed (e.g., a case rate), and dividing the case load by the case rate. The resource demand can be compared to a resource allocation, and the resource allocation can be changed based upon the resource demand. A information handling system can include a processor and a memory. The memory can have code stored therein, wherein the code can include instructions, which, when executed by the processor, allows the information handling system to perform part or substantially all of the method.

16 Claims, 6 Drawing Sheets

(56) References Cited

U.S. PATENT DOCUMENTS

| | | | |
|---|---|---|---|
| 2006/0062376 A1* | 3/2006 | Pickford | 379/265.12 |
| 2007/0043605 A1* | 2/2007 | Fisher et al. | 705/9 |
| 2007/0230681 A1* | 10/2007 | Boyer et al. | 379/265.1 |
| 2007/0230682 A1* | 10/2007 | Meghan et al. | 379/265.06 |
| 2007/0276717 A1 | 11/2007 | Alburey et al. | |
| 2007/0286359 A1* | 12/2007 | Odinak et al. | 379/67.1 |
| 2008/0040196 A1* | 2/2008 | Coon et al. | 705/10 |
| 2008/0056279 A1 | 3/2008 | Lund et al. | |
| 2008/0133287 A1* | 6/2008 | Slattery | 705/7 |
| 2008/0144804 A1* | 6/2008 | Mergen | 379/266.1 |
| 2008/0189160 A1 | 8/2008 | Fioto et al. | |
| 2008/0232575 A1* | 9/2008 | Gumbula | 379/265.11 |
| 2009/0232289 A1* | 9/2009 | Drucker et al. | 379/114.03 |
| 2009/0234778 A1* | 9/2009 | Drucker et al. | 705/400 |

OTHER PUBLICATIONS

Shumsky, "Gatekeepers and Referrals in Services," 2003, Management Science, vol. 49, No. 7, pp. 839-856.*

Jansen-Vullers, "A Redesign Framework for Call Centers," 2006, In Business Process Management, pp. 306-321, Springer Berlin Heidelberg.*

* cited by examiner

SYSTEM AND METHOD TO ALLOCATE RESOURCES IN SERVICE ORGANIZATIONS WITH NON-LINEAR WORKFLOWS

FIELD OF THE DISCLOSURE

This disclosure relates generally to operating a service organization, and relates more particularly to allocating resources in a service organization.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

As business markets expand for products and services, the need for a business to respond to requests for customer service also increases. Many businesses use a combination of web-based services such as frequently-asked-question (FAQ) web pages, customer service databases, and e-mail based and live support services, and telephone-based services including interactive voice response (IVR) systems and live support services. Businesses are faced with the task of allocating resources between these services to adequately meet the increasing number of service requests. In allocating resources, businesses can make assumptions as to the nature and duration of service requests, and how service requests are processed. For example, a business can assume that service requests are handled in a first-in-first-out queue, or that a service request will be processed in a set amount of time. If the assumptions are incorrect, the business can allocate resources incorrectly, leading to underutilized resources or to increased response times.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
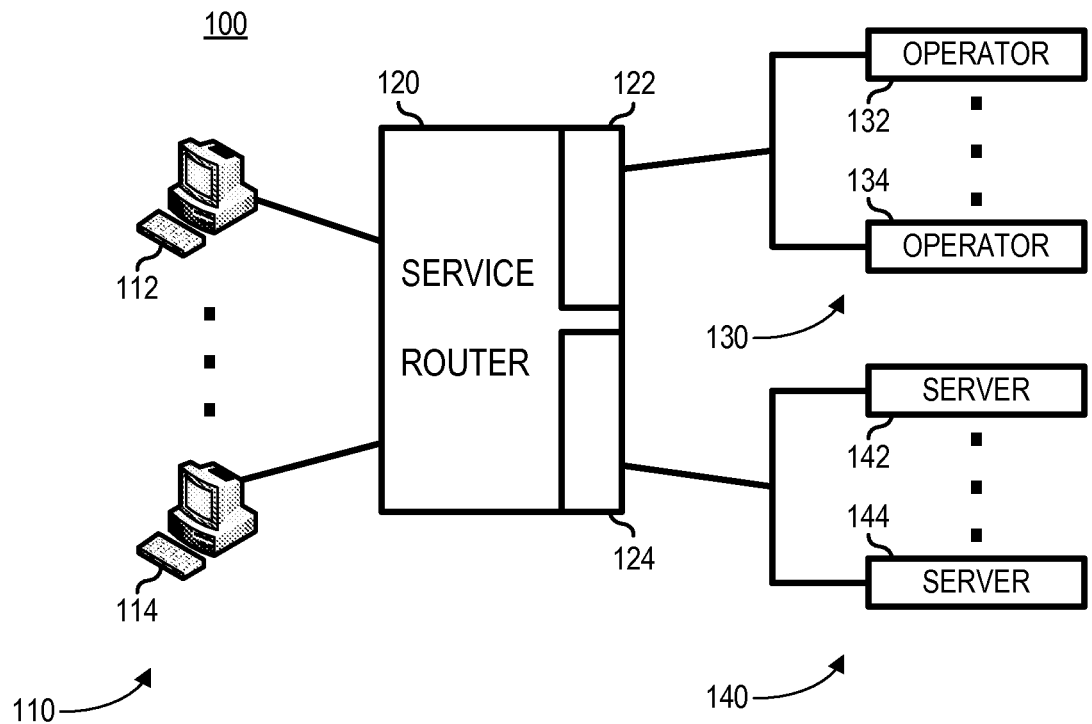
FIG. 1 is a functional block diagram of a customer service organization

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device can be used in place of a single device. Similarly, where more than one device is described herein, a single device can be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and can be found in textbooks and other sources within the computing, electronics, and software arts.

A customer service organization provides customer service to a customer base. In a particular embodiment, the customer service organization represents a service organization within a larger business structure. In one example, a computer manufacturer can include a service department that handles the complaints or problems encountered by owners or operators of the computer manufacturer's products (e.g., the customer base). In another example, a service company, such as a tax preparation company, or a provider of janitorial services can include a service department that schedules services or responds to queries by present or prospective customers. In another embodiment, the customer service organization represents a separate service company. For example, the computer manufacturer, the tax preparation company, or the janitorial service company can contract at least a portion of the service functions to an outside customer service provider, such as a call center. In another embodiment, the service organization includes a combination of internal and outside customer service support capabilities.

The customer service organization can provide a variety of channels for the customer base to gain access to the customer service. For example, the customer service organization can provide personal service in the form of a service center where a particular customer can go to obtain service, or in the form of mobile service personnel who can go to the customer location to provide the service. In another example, the customer service organization can provide web-based access to customer service resources such as a frequently-asked-question (FAQ) web page, a customer service database, e-mail-based or chat-based live support, or other web based access. Further, the customer service organization can provide telephone-based services such as an interactive voice response (IVR) system or live support services. In another embodiment, the customer service organization can provide a combination of personal service, web-based service, and telephone-based service.

The resources that the customer service organization uses to meet the demand for service from the customer base can include network-based and telephone-based switching equipment to direct service requests to the appropriate source of customer service, personnel (e.g., human resources, or headcount to staff call centers, handle service center requests, and make on-site service calls), and computing equipment (e.g., servers for web-based or IVR service requests). In some cases, the resources can be suitable to handle service requests from various request channels. For example, a service technician can be respond to service center calls, on-site service, or web-based or IVR service requests. Further, a server allocated to handle IVR service requests can be reallocated to handle web-based service requests. Thus the customer service organization can manage the resources to meet changing demands for service.

The customer service organization can provide services to the customer base through a variety of service arrangements. In one embodiment, the customer service organization provides free service to the customer base. In another embodiment, the customer service organization charges the customer base for service. In yet another embodiment, a combination of free service and fee-based service is provided. For example, customers with products that are under a warranty can receive service free of charge, while customers with products that are not under a warranty can have to pay a fee for service. In another example, the customer service organization can provide web-based access to an FAQ page or a customer service database for free, but charge to speak to a service representative.

FIG. 1 illustrates an embodiment of a customer service organization 100 that includes a customer base 110, a service router 120, a personal service network 130, and an automated service network 140. Customer base 110 includes a customer service unit 112, and one or more additional customer service units 114. Customer service units 112 and 114 can represent products and their owners, entities with service contracts, members of an at-large population, or other entities or individuals in a position to use the services provided by customer service organization. Service router 120 includes a personal service queue 122, and an automated service queue 124. Service router 120 receives service requests from customer service units 112 and 114 and routes the service requests to either personal service queue 122 or automated service queue 124, based upon whether or not the service request is for personal service or for web-based or IVR service.

Personal service network 130 includes an operator resource 132, and one or more additional operator resources 134. Operator resources 132 and 134 can represent a person who provides service in response to services requests, and can include a technician, an operator, a phone-bank volunteer, or another provider of service support. Similarly, automated service network 140 includes a server resource 142, and one or more additional server resources 144. Server resources 142 and 144 can represent a server farm or other information processing resource capable of providing web-based services or IVR services.

Service router 120 determines the type of service request being received from customer service units 112 and 114. Service router 120 also tracks the availability of operator resources 132 and 134 and server resources 142 and 144 to determine if the appropriate resource 132, 134, 142, or 144 is available to handle the service request. If no resource 132, 134, 142, or 144 is available for the particular type of service request, then service router 120 holds onto the service request until an appropriate resource 132, 134, 142, or 144 becomes available. In a particular embodiment, service router 120 can hold personal service requests in personal service queue 122, and can hold automated service requests in automated service queue 124.

If a service request is for personal service, service router 120 routes the service request to the back of personal service queue 122. When operator resource 132 or 134 becomes available to handle the service request, service router 120 forwards the service request at the front of personal service queue 122 to the available operator resource 132 or 134 to process the service request. Likewise, if a service request is for automated service, service router 120 routes the service request to the back of automated service queue 124. When a server resource 142 or 144 becomes available to handle the service request, service router 120 forwards the service request at the front of automated service queue 124 to the available server resource 142 or 144 to process the service request.

Figure 2:
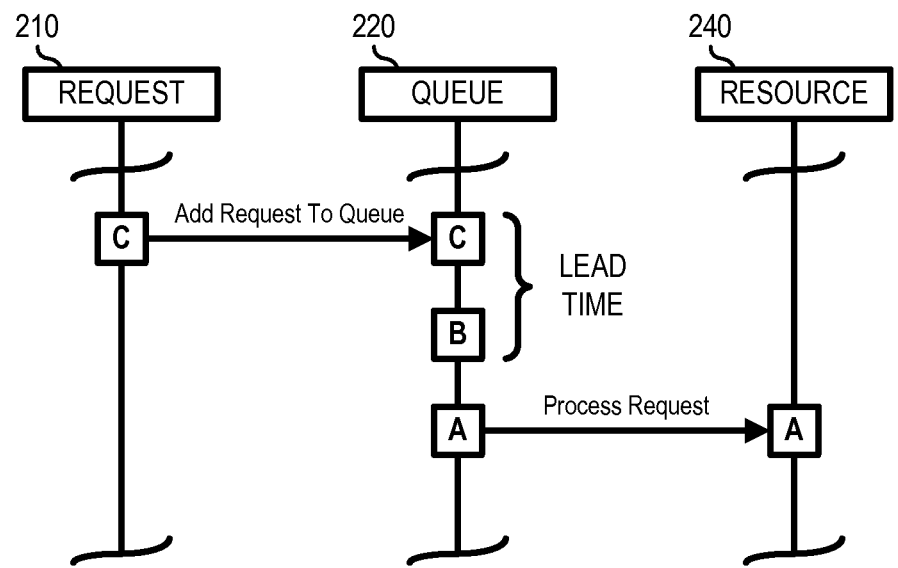
FIGS. 2-4 are diagrams illustrating an exemplary function of a customer service organization where the workflow in the customer service organization is linear.
Figure 3:
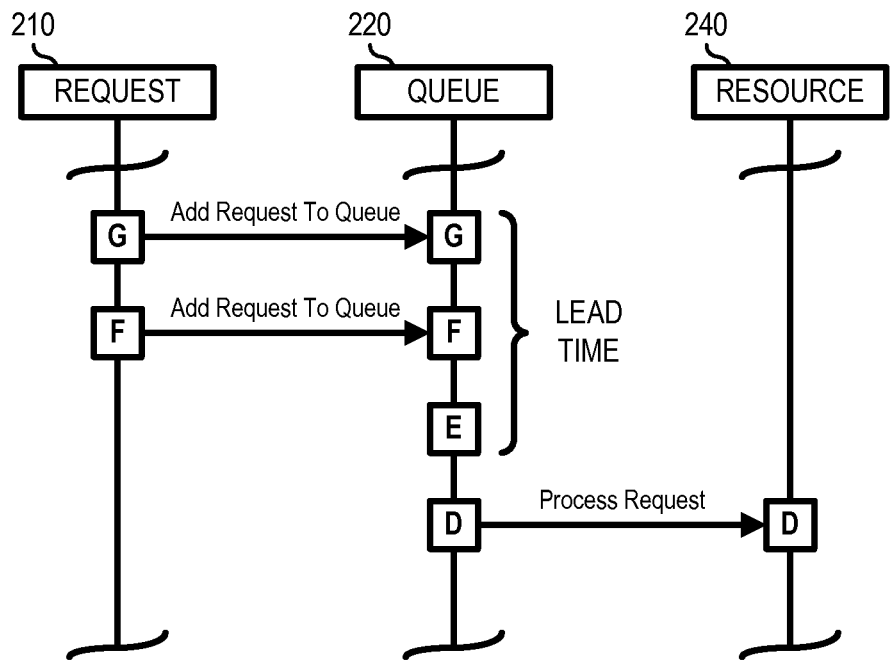
Figure 4:
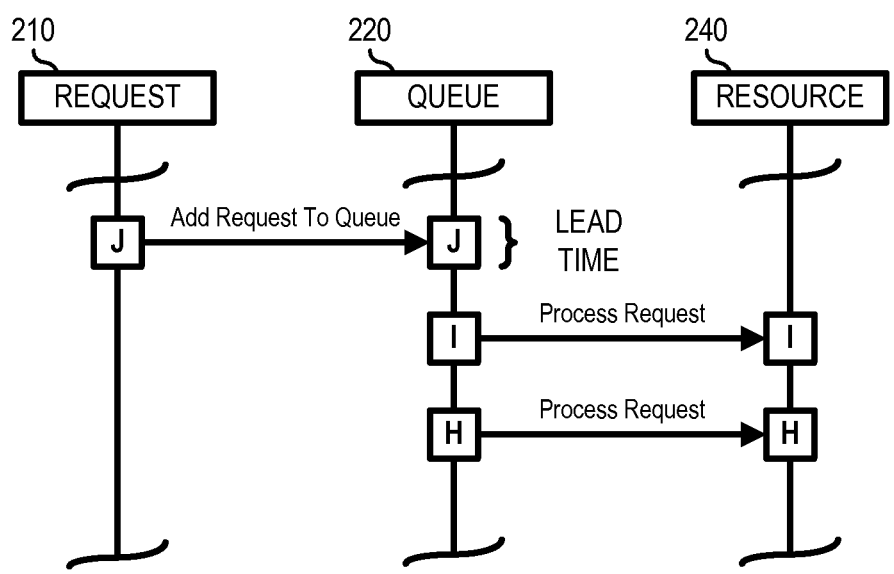

In another embodiment (not illustrated), service router 120 includes a single queue that receives both personal service requests and automated service requests. When an operator resource 132 or 134 becomes available to handle a service request, service router 120 forwards the personal service request that is closest to the front of the queue to the available operator resource 132 or 134 to process the personal service request. Likewise, when a server resource 142 or 144 becomes available to handle a service request, service router 120 forwards the automated service request that is closest to the front of the queue to the available server resource 142 or 144 to process the personal service request In a particular embodiment of customer service organization 100, any one or more of resources 132, 134, 142, and 144 can be used one time in processing a particular service request. That is, the service request will not be handled in more than one incident. For example, a first call to a service center can be sufficient to resolve the particular service request, without any subsequent use of resources 132, 134, 142, or 144. In this embodiment, the workflow performed by customer service organization 100 is termed a linear workflow. FIGS. 2-4 illustrate the function of a customer service organization similar to customer service organization 100 where the workflow is linear. Service requests that are received by a service router similar to service router 120 are illustrated under a single request block 210. Service requests that are in queue are illustrated under a queue block 230, and service requests that have been routed to a resource to be processed are illustrated under a resource block 240.

FIG. 2 illustrates an embodiment of the customer service organization where the number of service requests received in a given amount of time is substantially equal to the number of requests that can be processed by the resources in the given amount of time. The lead time is the amount of time a particular service request waits in the queue before being processed. In this embodiment, the lead time remains substantially constant, and the customer service organization is said to be balanced.

FIG. 3 illustrates an embodiment of the customer service organization where the number of service requests received in a given amount of time is greater than the number of requests that can be processed by the resources in the given amount of time. In this embodiment, the lead time will increase over time, so the customer service organization is said to be unbalanced. In order to regain balance, additional resources can be allocated to processing service requests. FIG. 4 illustrates another embodiment of the customer service organization where the number of service requests received in a given amount of time is less than the number of requests that can be processed by the resources in the given amount of time. In this unbalanced embodiment, the lead time will decrease over time, and resources can be reallocated to another purpose, instead of to processing service requests.

In another embodiment of customer service organization 100, any one or more of resources 132, 134, 142, and 144 can be used more than one time in order to fully process a particular service request. That is, the service request will be handled in more than one incident. Any one or more of resources 132, 134, 142 or 144 can be used more than one time because the outcome of a particular processing step in processing the service request could be uncertain, and further processing may depend on a response from a customer. For example, a technical support operation can respond to a service request with a diagnostic flow that takes time for the customer to implement and obtain diagnostic results. Alternatively, one or more of resources 132, 134, 142 or 144 can be used more than one time because a processing step takes time to complete. For example, a business can have on-line sales and marketing and be able to process orders, but the business may also request signed original documents before completing a customer order. Also, any one or more of resources 132, 134, 142 or 144 can be used more than one time because a processing step is not completed by the customer. For example, a customer can partially complete an on-line form and save the form for completion at a later time. In each of the foregoing situations, the workflow performed by customer service organization 100 is termed a non-linear workflow. In a non-linear workflow, the resource 132, 134, 142 or 144 that started processing the service request can work on processing another service request until the next processing incident of the prior service request is received. In a particular embodiment, when the following processing incident is received, the same resource 132, 134, 142 or 144 that started processing the service request can process the following processing incident. In another embodiment, when the following processing incident is received, a different resource 132, 134, 142 or 144 than the resource 132, 134, 142, or 144 that started processing the service request can process the following processing incident.

Figure 5:
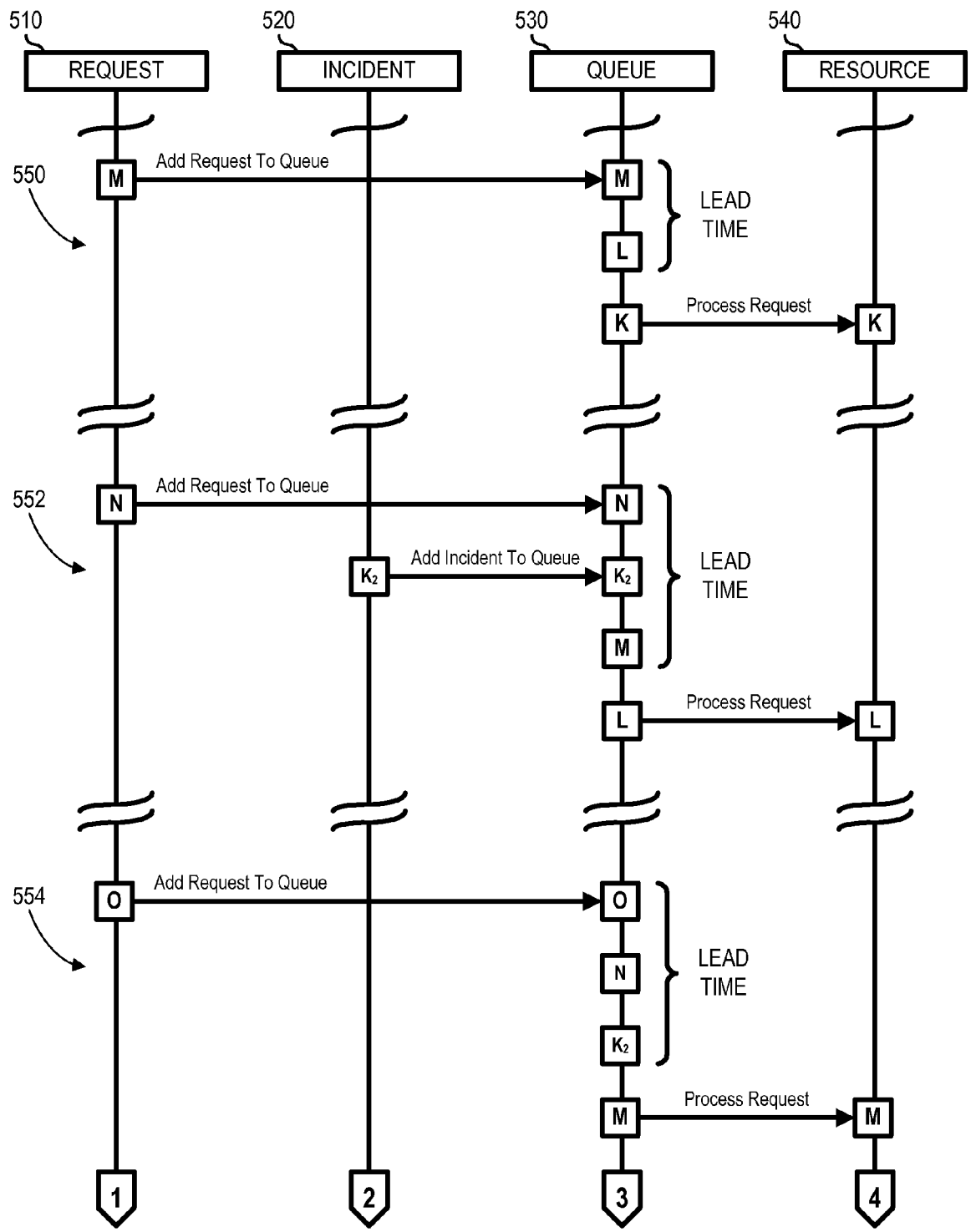
FIGS. 5-6 are diagrams illustrating an exemplary function of the customer service organization of FIG. 1 where the workflow in the customer service organization is non-linear.
Figure 6:
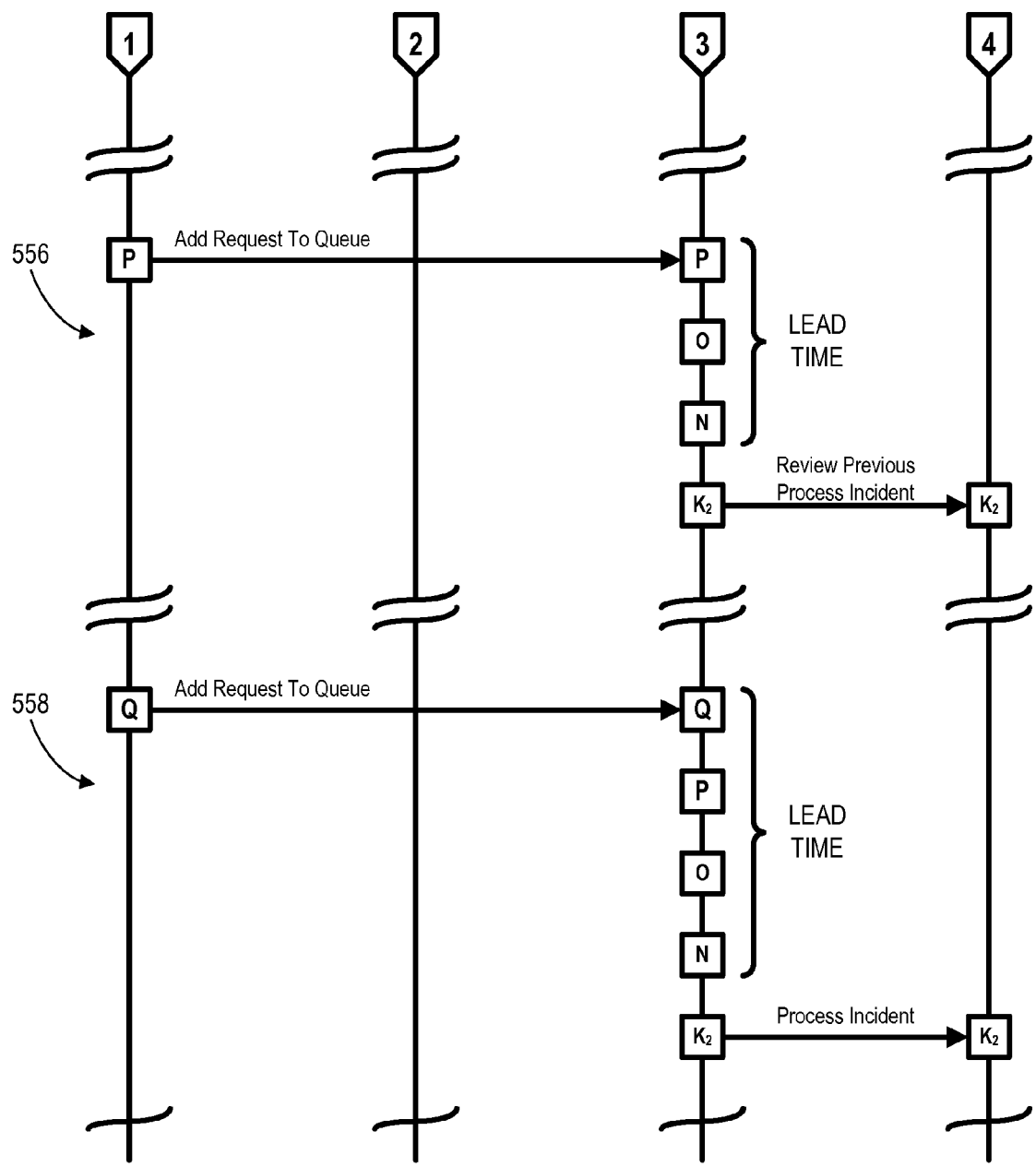

FIGS. 5-6 illustrate the function of a customer service organization similar to customer service organization 100 where the workflow is non-linear. New service requests received by a service router similar to service router 120 are illustrated under a request block 510. Subsequent incidents of a service request that was previously processed by a resource are illustrated under an incident block 520. Service requests that are in queue are illustrated under a queue block 530, and service requests that have been routed to a resource to be processed are illustrated under a resource block 540.

In a first timeframe 550, illustrated in FIG. 5, a new service request M is received from customer base 110, and service router 120, determining that there are no resources available to process service request M, places service request M at the back of the queue behind service requests L and K. When a resource becomes available to process a service request, service router 120 forwards service request K to the resource to be processed. In timeframe 550, the lead time is two service requests long. In a following timeframe 552, a second incident of service request K, labeled $K_2$, is received. For example, a customer can provide a technical service center with diagnostic results from a diagnostic flow received during an earlier incident of a service request. Service router 120 places service request $K_2$ at the back of the queue behind service request M and L. Also, a new service request N is received from customer base 110, and service router 120 places service request N at the back of the queue behind service requests $K_2$, M, and L. When a resource becomes available to process a service request, service router 120 forwards service request L to the resource to be processed. Thus, because of the addition of the second incident of service request $K_2$ to the queue, the lead time has grown to three service requests long in timeframe 552. In another following timeframe 554, a new service request O is received from customer base 110, and service router 120 places service request O at the back of the queue behind service requests N, $K_2$, and M. When a resource becomes available to process a service request, service router 120 forwards service request M to the resource to be processed. Thus, in timeframe 554 the lead time remains three service requests long.

In another following timeframe 556, illustrated in FIG. 6, a new service request P is received from customer base 110, and service router 120 places service request P at the back of the queue behind service requests O, N, and $K_2$. When a resource becomes available to process a service request, service router 120 forwards service request $K_2$ to the resource to be processed. However, because service request $K_2$ is a second incident of service request K, the resource can spend time reviewing the processing completed in the previous incident of service request K, before being able to complete the processing of service request $K_2$. Thus, in timeframe 556, the lead time remains three service requests long, but the processing of service request $K_2$ is not completed. In another following timeframe 558, a new service request Q is received from customer base 110, and service router 120 places service request Q at the back of the queue behind service requests P, O, N, and $K_2$. The resource which began processing service request $K_2$ in timeframe 556 continues processing service request $K_2$ in timeframe 558. Thus, because of the additional processing performed on service request $K_2$, the lead time has grown to four service requests long in timeframe 558.

Notice that the lead time starts out at two service requests long in timeframe 550, and grows to four service requests long in timeframe 558. Thus, as illustrated in FIGS. 5-6, customer service organization 100 is unbalanced due to the non-linear workflow. As in the unbalanced case of linear workflow, illustrated in FIG. 4, additional resources can be allocated to processing service requests to improve the balance of customer service organization 100. Also, in a particular embodiment (not illustrated), service router 120 can place subsequent incidents of a service request at the front of the queue. In another embodiment (not illustrated), service requests can be assigned a priority. When a new service request or a subsequent incident of a service request is received, service router 120 can place the service request in the queue in front of service requests with a lower priority and behind service requests with a higher priority.

In order to better balance customer service organization 100, the operator of customer service organization 100 can reallocate operator resources 132 and 134 or reallocate server resources 142 and 144 from one function to another. For example, to meet a rising demand for service, a product warranty center can add to its headcount of technicians to respond to service requests. In another example, in response to a lower demand for service, a business can reallocate servers that are dedicated to an IVR system to other business purposes. Thus, the operator of customer service organization 100 can try to predict a more balanced allocation of resources based upon historical data and current trends. For example, the operator can measure the number of service requests received, the rate at which service requests are received, the growth or decline in the rate, or other measurements of expected demand for service. Also, the operator can measure the number of resources, the efficiency of each resource, the rate at which the resources can process the service requests, or other measures of productivity of customer service organization 100.

In a particular embodiment, a customer service organization is in balance when:

$$R_{in}=R_{out} \quad \text{(Equation 1)}$$

where $R_{in}$ is the rate at which service requests are received and $R_{out}$ is the rate at which service requests are processed. $R_{in}$ and $R_{out}$ can be in units of service requests per time, where the timeframe is chosen to be appropriate to the particular customer service organization. When the customer service organization has multiple resources:

$$R_{out}=N \times R_{resource} \quad \text{(Equation 2)}$$

where N is the number of resources in the customer service organization, and $R_{resource}$ is the rate at which a resource can process service requests. Thus the number of resources needed in the customer service organization is given as:

$$N = \frac{R_{in}}{R_{resource}} \quad \text{(Equation 3)}$$

In some cases, $R_{resource}$ is not easily measured. However, measuring the amount of time a resource spends processing a service request can be easier. In general, the amount of time a resource spends processing a service request can be give as:

$$W=W_A+W_{OH} \quad \text{(Equation 4)}$$

where W is the amount of time per service request a resource spends to process a service request, $W_A$ is the time per service request spent actually processing the service request, and $W_{OH}$ is the time per service request that is overhead.

Figure 7:
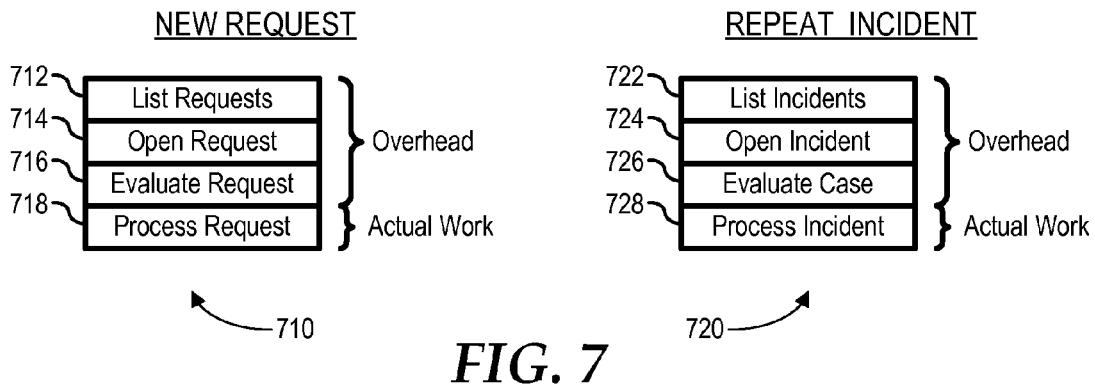
FIG. 7 is an illustration of service requests in the customer service organization of FIG. 1.

FIG. 7 illustrates an embodiment of service requests in customer service organization 100. In this embodiment, the resource is an operator resource 132 or 134. A new service request 710 and a repeat incident 720 are illustrated. New service request 710 includes a time to list service requests 712, a time to open the service request 714, a time to evaluate the service request 716, and a time to process the service request 718. The sum of the times to list service requests 712, to open the service request 714, and to evaluate the service request 716 is the overhead $W_{OH}$ for new service request 710, while the time to process the service request 718 is the time actually spent processing $W_A$ for new service request 710. Likewise, repeat incident 720 includes a time to list incidents 722, a time to open the repeat incident 724, a time to evaluate the repeat incident 726, and a time to process the repeat incident 728. The sum of the times to list incidents 722, to open the repeat incident 724, and to evaluate the repeat incident 726 is the overhead $W_{OH}$ for repeat incident 720, while the time to process the repeat incident 728 is the time actually spent processing $W_A$ for repeat incident 720. Thus, for a new service request:

$$W_{OH}L+O+E \quad \text{(Equation 5)}$$

where L is the time to list service requests, O is the time to open the service request, and E is the time to evaluate the service request. Or, more generally:

$$W_{OH}=I(L+O+E) \quad \text{(Equation 6)}$$

where I is the number of incidents to fully process the service request, and therefore:

$$W=W_A+I(L+O+E) \quad \text{(Equation 7)}$$

Not that ideally the rate at which a resource can process service requests $R_{resource}$ is the reciprocal of the amount of time per service request a resource spends to process a service request W, or:

$$R_{resource} = \frac{1}{W} \quad \text{(Equation 8)}$$

However, in some situations resources cannot be dedicated to processing service requests full time. For example, with human resources, some of the work time can be dedicated to breaks, meetings, training, or other activities which reduce the amount of time available to process service request. Further, a person in the customer service organization may be only partially allocated to the task of processing service requests. Likewise, with processing resources, a portion of the processing capacity can be allocated to tasks other than processing service requests. For example, a server may require maintenance and repair, or may be allocated to other processing functions within the customer service organization Thus, the rate at which a resource can process service requests $R_{resource}$ can be reduced by an efficiency factor, such that:

$$R_{resources} = \frac{E}{W} \quad \text{(Equation 9)}$$

where E is the efficiency factor. E can be given as:

$$E = \frac{T_A}{D} \quad \text{(Equation 10)}$$

where $T_A$ is the amount of time available to process service requests, and D is the total amount of time. The total amount of time D can depend on whether the resource is an operator resource 132 or 134, or a server resource 142 or 144. For example, when dealing with operator resources 132 and 134, the total amount of time D is typically on the order of 8 hours per day, while the total amount of time D is typically on the order of 24 hours per day for server resources 142 and 144.

Therefore, substituting equations 7 and 10 into equation 9 yields:

$$R_{resources} = \frac{T_A}{D(W_A + I(L + O + E))} \quad \text{(Equation 11)}$$

Finally, substituting equation 11 into equation 3 yields:

$$N = \frac{D}{T_A} \times R_{in}(W_A + I(L + O + E)) \quad \text{(Equation 12)}$$

or:

$$N = \frac{R_{in} \times W}{E} \quad \text{(Equation 13)}$$

Note that equations 12 and 13 can lead to fractional values for the number of resources in the customer service organization N. In the context of personnel, a fractional number of resources can refer to a person in the customer service organization who is allocated to the task of processing service requests for a percentage of time that is substantially equal to the fractional value of N. In the context of processing resources, a fractional number of resources can refer to a processing resource in the customer service organization that is allocated to the task of processing service requests for a percentage of time that is substantially equal to the fractional value of N. In another embodiment, N may be an integer, rather than a fractional value.

Upon determining the number of resources in the customer service organization N, based upon the rate at which service requests are received $R_{in}$, the amount of time per service request a resource spends to process a service request W, and the efficiency factor E, the operator of the customer service organization can compare N with the actual number of resources in the customer service organization $N_A$. If:

$$N_A > N \quad \text{(Equation 14)}$$

the operator can reallocate resources away from processing service requests and to other tasks. On the other hand, if:

$$N_A < N \quad \text{(Equation 15)}$$

then the operator can allocate additional resources to the processing of service requests.

In a particular embodiment, the customer service organization can reallocate processing resources away from processing automated service requests, or can allocate additional processing resources to the processing of automated service requests based upon a determination of the amount of processing resources desired by the customer service organization to satisfy a particular rate at which automated service requests are received, based upon the amount of time per automated service request a processing resource spends to process an automated service request, and the efficiency factor of the processing resource. When the determination of the amount of processing resources desired by the customer service organization includes an integer, the customer service organization can reduce or increase the amount of processing resources by an amount substantially equal to the integer. When the determination of the amount of processing resources desired by the customer service organization includes a fractional number, the customer service organization can reduce or increase the amount of time a particular processing resource is dedicated to processing automated service requests by an amount that is substantially equal to the fractional number. In this embodiment, the determination of the amount of processing resources desired by the customer service organization can be the basis to automatically add or reduce the amount of processing resources in the customer service organization. For example, a server farm can automatically allocate additional servers to processing automated service requests upon detecting an increase in the rate of incoming automated service requests.

In another embodiment, the customer service organization can reallocate human resources away from processing personal service requests, or can allocate additional human resources to the processing of personal service requests based upon a determination of the amount of human resources desired by the customer service organization to satisfy a particular rate at which personal service requests are received, based upon the amount of time per personal service request a human resource spends to process a personal service request, and the efficiency factor of the human resource. In this embodiment, the determination of the number of human resources desired by the customer service organization can be the basis for an action to hire or lay off personnel in the customer service organization.

Figure 8:
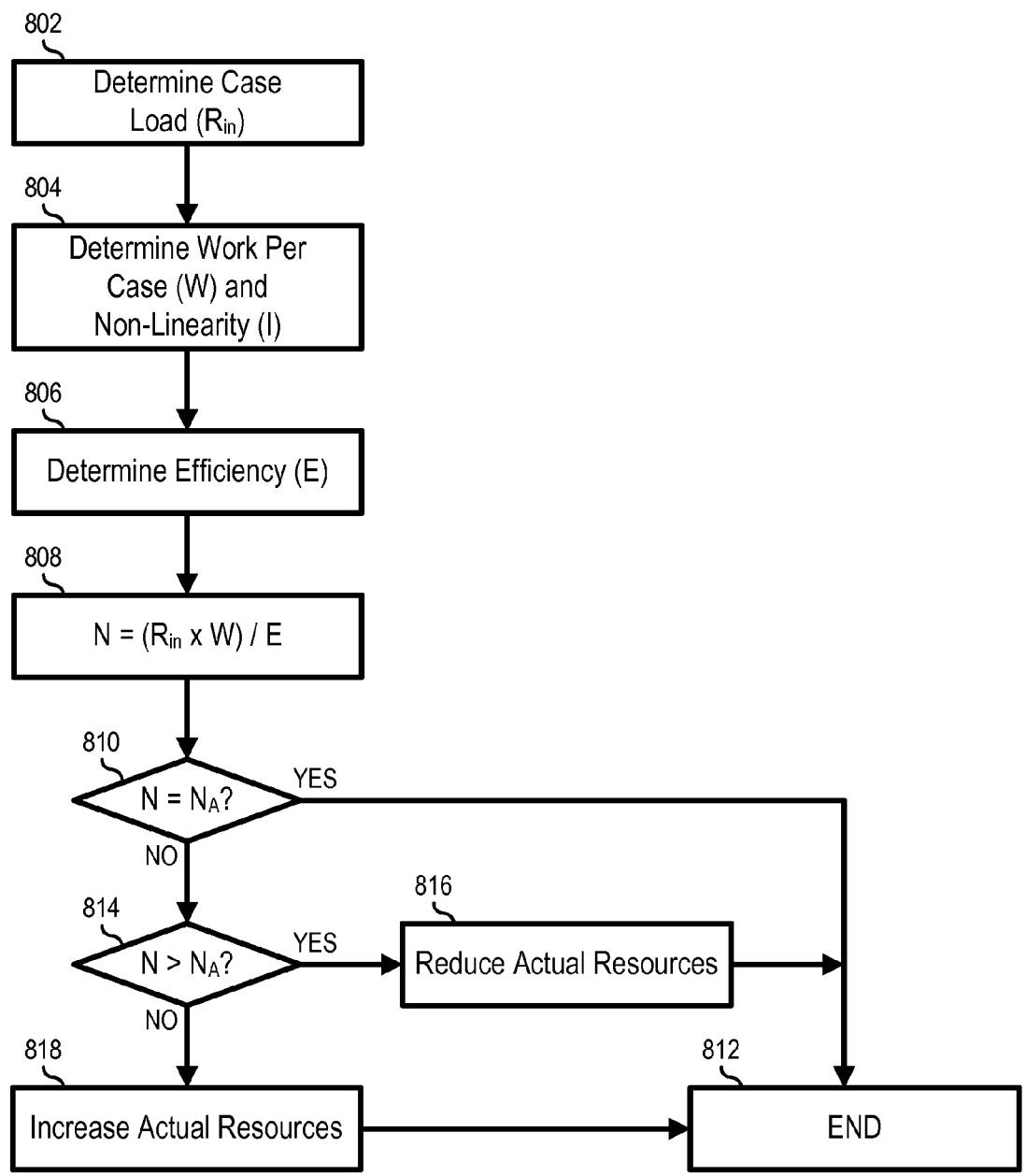
FIG. 8 is a flow chart illustrating a method of allocating resources in a service organization.

FIG. 8 illustrates a method of allocating resources in a service organization. A case load is determined for the service organization in block 802. For example, the case load can be similar to the rate at which service requests are received $R_{in}$ by customer service organization 100, as described above. A work per case, including a degree of non-linearity per case is determined for the service organization in block 804. For example, the work per case can be similar to the work per case of customer service organization 100, as described above, and can include determining a time per service request spent actually processing the service request, a time per service request that is overhead, a time to list service requests, a time to open the service request, a time to evaluate the service request, and a number of incidents to fully process the service request (e.g., a non-linearity per case). An efficiency factor is determined for the service organization in block 806. For example, the efficiency factor can be similar to the efficiency factor of customer service organization 100, as described above.

The case load is multiplied by the work per case, and divided by the efficiency factor to determine a predicted resource count N in block 808. A decision is made as to whether or not the predicted resource count N is equal to an actual resource count $N_A$ in decision block 810. If so, the "YES" branch of decision block 810 is taken, and the method ends at block 812. If the predicted resource count N is not equal to the actual resource count $N_A$, the "NO" branch of decision block 810 is taken, and a decision is made as to whether or not the predicted resource count N is greater than the actual resource count $N_A$ in decision block 814. If so, the "YES" branch of decision block 814 is taken, the actual resource count NA is reduced in block 816, and the method ends at block 812. If the predicted resource count N is greater than the actual resource count $N_A$, the "NO" branch of decision block 814 is taken, the actual resource count NA is increased in block 818, and the method ends at block 812.

Figure 9:
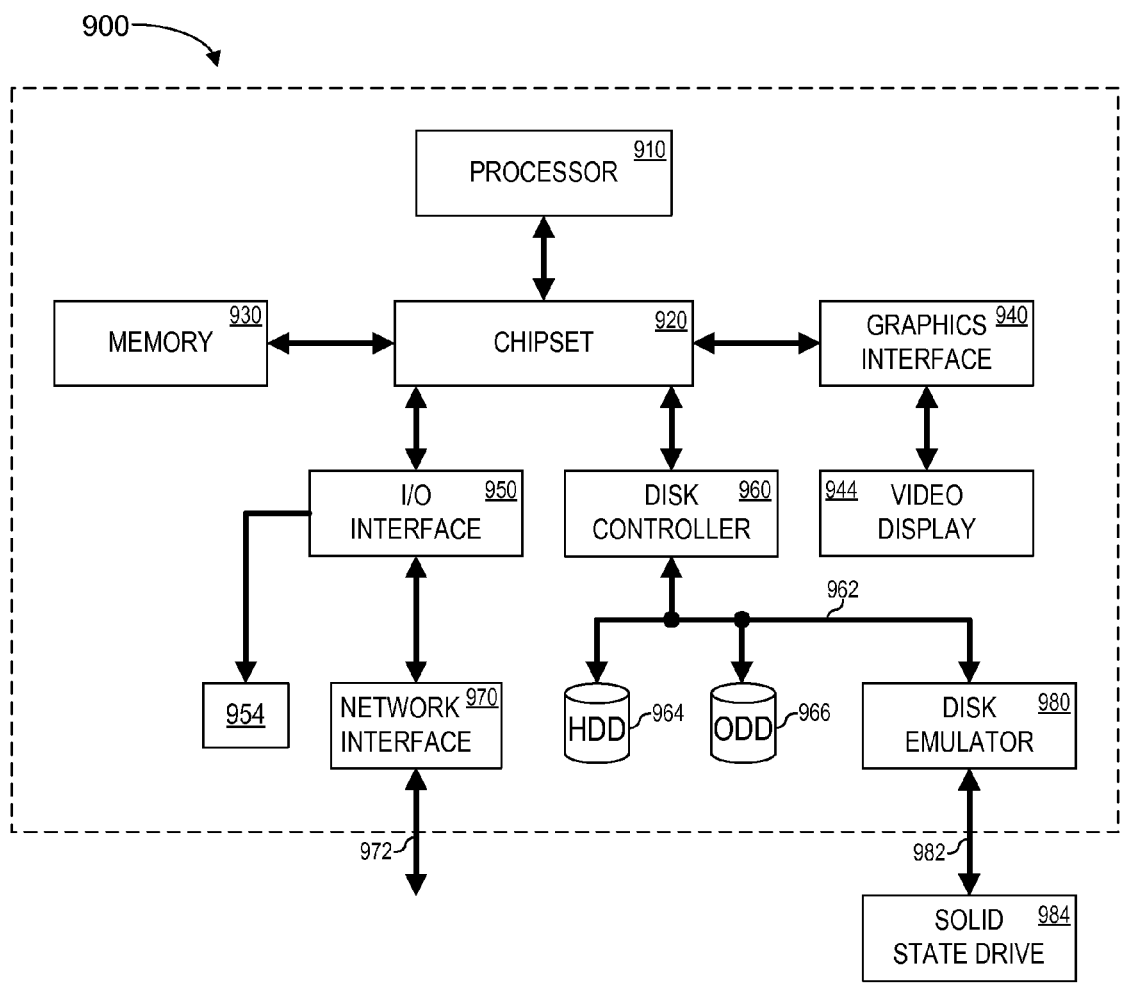
FIG. 9 is a functional block diagram illustrating an exemplary embodiment of an information handling system.

In a particular embodiment, an information handling system can be used to carry out one or more of the previously described methods, in whole or in part. In another embodiment, one or more of the systems described above can be implemented in the form of an information handling system. FIG. 9 illustrates a functional block diagram of an embodiment of an information handling system, generally designated as 900. Information handling system 900 includes processor 910, a chipset 920, a memory 930, a graphics interface 940, an input/output (I/O) interface 950, a disk controller 960, a network interface 970, and a disk emulator 980.

Processor 910 is coupled to chipset 920. Chipset 920 supports processor 910, allowing processor 910 to process machine-executable code. In a particular embodiment (not illustrated), information handling system 900 includes one or more additional processors, and chipset 920 supports the multiple processors, allowing simultaneous processing by each of the processors, permitting the exchange of information between the processors and the other elements of information handling system 900. Processor 910 can be coupled to chipset 920 via a unique channel, or via a bus that shares information between processor 910, chipset 920, and other elements of information handling system 900.

Memory 930 is coupled to chipset 920. Memory 930 can be coupled to chipset 920 via a unique channel, or via a bus that shares information between chipset 920, memory 930, and other elements of information handling system 900. In particular, a bus can share information between processor 910, chipset 920 and memory 930. In a particular embodiment (not illustrated), processor 910 is coupled to memory 930 through a unique channel. In accordance with another aspect (not illustrated), an information handling system can include a separate memory dedicated to each of the processors. A non-limiting example of memory 930 includes static, dynamic. Or non-volatile random access memory (SRAM, DRAM, or NVRAM), read only memory (ROM), flash memory, another type of memory, or any combination thereof.

Graphics interface 940 is coupled to chipset 920. Graphics interface 940 can be coupled to chipset 920 via a unique channel, or via a bus that shares information between chipset 920, graphics interface 940, and other elements of information handling system 900. Graphics interface 940 is coupled to a video display 944. Other graphics interfaces (not illustrated) can also be used in addition to graphics interface 940 if needed or desired. Video display 944 can include one or more types of video displays, such as a flat panel display or other type of display device.

I/O interface 950 is coupled to chipset 920. I/O interface 950 can be coupled to chipset 920 via a unique channel, or via a bus that shares information between chipset 920, I/O interface 950, and other elements of information handling system 900. Other I/O interfaces (not illustrated) can also be used in addition to I/O interface 950 if needed or desired. I/O interface 950 is coupled to one or more add-on resources 954. Add-on resource 954 can include a data storage system, a graphics interface, a network interface card (NIC), a sound/video processing card, another suitable add-on resource or any combination thereof.

Network interface device 970 is coupled to I/O interface 950. Network interface 970 can be coupled to I/O interface 950 via a unique channel, or via a bus that shares information between I/O interface 950, network interface 970, and other elements of information handling system 900. Other network interfaces (not illustrated) can also be used in addition to network interface 970 if needed or desired. Network interface 970 can be a network interface card (NIC) disposed within information handling system 900, on a main circuit board (e.g., a baseboard, a motherboard, or any combination thereof), integrated onto another component such as chipset 920, in another suitable location, or any combination thereof. Network interface 970 includes a network channel 972 that provide interfaces between information handling system 900 and other devices (not illustrated) that are external to information handling system 900. Network interface 970 can also include additional network channels (not illustrated).

Disk controller 960 is coupled to chipset 910. Disk controller 960 can be coupled to chipset 920 via a unique channel, or via a bus that shares information between chipset 920, disk controller 960, and other elements of information handling system 900. Other disk controllers (not illustrated) can also be used in addition to disk controller 960 if needed or desired. Disk controller 960 can include a disk interface 962. Disk controller 960 can be coupled to one or more disk drives via disk interface 962. Such disk drives include a hard disk drive (HDD) 964 or an optical disk drive (ODD) 966 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 960 can be coupled to disk emulator 980. Disk emulator 980 can permit a solid-state drive 984 to be coupled to information handling system 900 via an external interface. The external interface can include industry standard busses (e.g., USB or IEEE 1384 (Firewire)) or proprietary busses, or any combination thereof. Alternatively, solid-state drive 984 can be disposed within information handling system 900.

In a first aspect, a method includes determining a case load for an organization where the case load includes a number of cases the organization expects to process in a duration of time. The method also includes determining a case rate for a work resource in the organization where the case rate includes a number of cases that the work resource can process in the duration of time a particular case within a subset of the cases is processed non-linearly. The method further includes determining a resource demand prediction by dividing the case load by the case rate, comparing the resource demand prediction to an actual resource allocation in the organization, and changing the actual resource allocation in response to comparing the resource demand prediction to the first actual resource allocation.

In an embodiment of the first aspect, the particular case is processed by the work resource in more than one incident. In a further embodiment, another particular case is processed by the work resource in one incident. In another embodiment, determining the case rate for the work resource further includes determining an amount of time the work resource is available to work on cases, determining an average amount of time per case that the work resource spends processing multiple cases, and dividing the amount of time by the duration of time and by the average amount of time per case. In yet another embodiment, determining the average amount of time per case includes averaging another amount of time the work resource spends processing the particular cases. In still another embodiment, the average amount of time per case is determined as the sum of an amount of time the work resource spends processing the multiple cases, and an amount of time the work resource spends preparing to work on the multiple cases. In a further embodiment, the amount of time the work resource spends preparing to work on the multiple cases is determined as the average number of incidents to process the multiple cases, multiplied by the sum of an average amount of time per incident to list the multiple cases, an average amount of time per incident to open the multiple cases, and an average amount of time per incident to read the multiple cases.

In another embodiment of the first aspect, when the resource demand prediction is greater than the actual resource allocation, changing the actual resource allocation includes increasing the number of work resources. In another embodiment of the first aspect, when the resource demand prediction is less than the actual resource allocation, changing the actual resource allocation includes decreasing the number of work resources.

In a second aspect, a memory for an information handling system has machine-executable code stored therein, and the machine-executable code includes instructions to carry out a method. The method includes determining a case load for an organization where the case load includes a number of cases the organization expects to process in a duration of time. The method also includes determining a case rate for a work resource in the organization, where the case rate includes a number of cases that the work resource can process in the duration of time, and a particular case within a subset of the cases is processed non-linearly. The method further includes determining a resource demand prediction by dividing the case load by the case rate, comparing the resource demand prediction to an actual resource allocation in the organization, storing a recommended resource allocation that is based on the difference between the resource demand prediction and the actual resource allocation in the memory, and changing the actual resource allocation in response to storing the recommended resource allocation.

In an embodiment of the second aspect, the particular case is processed by the work resource in more than one incident. In another embodiment, another particular case is processed by the work resource in one incident. In still another embodiment, determining the case rate for the work resource includes determining an amount of time the work resource is available to work on cases, determining an average amount of time per case that the work resource spends processing multiple cases where determining the average amount of time per case includes averaging an amount of time the work resource spends processing the particular cases, and dividing the amount of time by the duration of time and by the average amount of time per case. In another embodiment, the average amount of time per case is determined as the sum of another amount of time the work resource spends processing the multiple of cases, and another amount of time the work resource spends preparing to work on the multiple cases where the amount of time is determined as an average number of incidents to process the multiple cases, multiplied by the sum of an average amount of time per incident to list the multiple cases, an amount of time per incident to open the multiple cases, and an average amount of time per incident to read the multiple cases.

In another embodiment of the second aspect, when the recommended resource allocation is greater than zero, changing the actual resource allocation includes increasing the number of work resources. In yet another embodiment of the second aspect, when the recommended resource allocation is less than zero, changing the actual resource allocation includes decreasing the number of work resources.

In a third aspect, an information handling system includes a memory device that includes machine-executable code stored therein, and a processor. The processor is operable to execute the machine-executable code to determine a case load for an organization that includes a number of cases the organization expects to process in a duration of time. The processor is also operable to determine a case rate for a worker in the organization where the case rate includes a number of cases that the worker can process in the duration of time and a particular case within a subset of the multiple cases is processed non-linearly. The processor is further operable to divide the case load by the case rate to determine a headcount prediction, subtract the headcount prediction from an actual headcount in the organization to determine a recommended headcount, store the recommended headcount in the memory device, and reallocate a resource within the organization based upon the recommended headcount.

In an embodiment of the third aspect, the processor is further operable to determine an amount of time the worker is available to work on cases, determine an average amount of time per case that the worker spends processing the multiple cases, and divide the amount of time by the duration of time and by the average amount of time per case. In another embodiment, the processor is further operable to sum another amount of time the worker spends processing the multiple cases, and another amount of time the worker spends preparing to work on the multiple cases. In yet another embodiment, the processor is further operable to multiply an average number of touches to process the multiple cases to the sum of an average amount of time per touch to list the multiple cases, an average amount of time per touch to open the multiple cases, and an average amount of time per touch to read the multiple cases.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal data assistant, a consumer electronic device (e.g., a portable music player, a portable DVD player, or a digital video recorder, etc.), a network communication device (e.g., a server or server blade, a storage device, a switch/router, a wireless router, etc.), or any other suitable device, and can vary in size, shape, performance, functionality, and price. An information handling system can also include a set of any of the foregoing devices.

Portions of an information handling system, when referred to as a "device", a "module", a "resource", or the like, can be configured as hardware, firmware, software, or any combination thereof. A device, a module, or a resource can be implemented in hardware. A non-limiting example of a device, a module, or a resource implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-Express (PCIe) card, a Personal Computer Memory Card International Association (PCMCIA) card, or other such expansion card), or a system (e.g., a motherboard, a system-on-a-chip (SoC), or a stand-alone device). Similarly, the device, a module, or a resource can be implemented in firmware (i.e., any software running on an embedded device, a Pentium class or PowerPC™ brand processor, or other such device) or in software (i.e., any software capable of operating in the relevant environment). The device, module, or resource can also be implemented as a combination of hardware, firmware, or software. Note that an information handling system can include an integrated circuit or a board-level product having portions thereof that can also be any combination of hardware, firmware, or software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The embodiments discussed above describe, in part, distributed computing solutions that manage all or part of a communicative interaction between network elements. A network element can be a node, a piece of hardware, software, firmware, middleware, another component of a computing system, or any combination thereof. In this context, a communicative interaction can be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction can be "a conversation," or series of related communications between a client and a server—each network element sending and receiving information to and from the other. Whatever form the communicative interaction takes, the network elements involved need not take any specific form.

Two or more information handling systems can be coupled together in a network such that individual information handling systems in the network, referred to as nodes of the network, can exchange information with each other. A non-limiting example of a network includes a local area network (LAN), a metropolitan area network (MAN), a storage area network (SAN), a wide area network (WAN), a wireless local area network (WLAN), a virtual private network (VPN), an intranet, the Internet, any other appropriate network architecture or system, or any combination thereof. The nodes on a network can include storage devices, file servers, print servers, personal computers, laptop computers, personal data assistants, media content players, other devices capable of being coupled to a network, or any combination thereof.

In the description above, a flow-charted technique can be described in a series of sequential actions. The sequence of the actions and the party performing the steps can be freely changed without departing from the scope of the teachings. Actions can be added, deleted, or altered in several ways. Similarly, the actions can be re-ordered or iterated. Further, although processes, methods, algorithms, or the like can be described in a sequential order, such processes, methods, algorithms, or any combination thereof can be operable to be performed in alternative orders. Further, some actions within a process, method, or algorithm can be performed simultaneously during at least a point in time (e.g., actions performed in parallel), can also be performed in whole, in part, or any combination thereof.

Note that not all of the activities described above in the general description or the examples are required, that a portion of a specific activity can not be required, and that one or more further activities can be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments can be apparent to those of skill in the art upon reviewing the disclosure. Other embodiments can be used and derived from the disclosure, such that a structural substitution, logical substitution, or another change can be made without departing from the scope of the disclosure. Accordingly, the disclosure is to be regarded as illustrative rather than restrictive.

Certain features described herein in the context of separate embodiments for the sake of clarity, can also be provided in combination in a single embodiment. Conversely, various features that are, for brevity, described in the context of a single embodiment, can also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that can cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

determining by a service router a case load for a server farm, wherein the case load includes a number of cases the server farm expects to process ($R_{IN}$) in a duration of time (D);

determining by the service an amount of time spent processing each case for a server resource in the server farm (W), wherein:

the amount of time spent processing each case (W) includes a number of cases that the server resource can process in the duration of time; and the amount of time spent processing each case (W) is determined by:

(i) determining a first average amount of time per case that the server resource spends processing the cases ($W_A$);

(ii) determining a second average amount of time to list the previous incidents for each case (L);

(iii) determining a third average amount of time per case to open the previous incidents for each case (O);

(iv) determining a fourth average amount of time per case to read the previous incidents for each case (E);

(v) determining a non-linearity per case (I), representing an average number of incidents to fully process each case;

(vi) summing the second average amount of time to list the previous incidents for each case (L), the third average amount of time to open the previous incidents for each case (O), and the fourth average amount of time per case to read the previous incidents for each case (E);

(vii) multiplying the non-linearity per case (I) with the summed value of the second average amount of time (L), third average amount of time (O), and the fourth average amount of time (E);

(viii) summing the first average amount of time per case ($W_A$) and the determined multiplied value in (vii) to determine the amount of time spent processing each case (W);

determining a server demand prediction R, such that;

$$R = \frac{D}{Ta} \times R_{IN}(W_A + I(L + O + E))$$

where D is the duration of time and Ta is an amount of time available to work on cases;

comparing the server demand prediction based on the non-linearity per case (I) to an actual server allocation in the server farm; and in response to comparing the server demand prediction to the actual server allocation, changing the actual server allocation to balance the actual server allocation to the server demand prediction.

2. The method of claim 1, wherein a first particular case is processed by the server resource in more than one incident.

3. The method of claim 2, wherein a second particular case is processed by the server resource in one incident.

4. The method of claim 3, wherein determining the first average amount of time per case includes averaging a second amount of time the server resource spends processing:
   the first particular case; and
   the second particular case.

5. The method of claim 1, wherein, when the server demand prediction is greater than the actual server allocation, changing the actual server allocation includes increasing the number of server resources.

6. The method of claim 1, wherein, when the server demand prediction is less than the actual server allocation, changing the actual server allocation includes decreasing the number of server resources.

7. A memory for an information handling system, wherein the memory has machine-executable code stored therein, and wherein the machine-executable code includes instructions for carrying out a method comprising:
   determining a case load for a server farm, wherein the case load includes a number of cases the server farm expects to process ($R_{IN}$) in a duration of time (D);
   determining an amount of time spent processing each case for a server resource in the server farm (W), wherein:
      the amount of time spent processing each case (W) includes a number of cases that the server resource can process in the duration of time;
      the amount of time spent processing each case (W) is determined by:
         (i) determining a first average amount of time per case that the server resource spends processing the cases ($W_A$);
         (ii) determining a second average amount of time to list the previous incidents for each case (L);
         (iii) determining a third average amount of time per case to open the previous incidents for each case (O);
         (iv) determining a fourth average amount of time per case to read the previous incidents for each case (E);
         (v) determining a non-linearity per case (I), representing an average number of incidents to fully process each case;
         (vi) summing the second average amount of time to list the previous incidents for each case (L), the third average amount of time to open the previous incidents for each case (O), and the fourth average amount of time per case to read the previous incidents for each case (E);
         (vii) multiplying the non-linearity per case (I) with the summed value of the second average amount of time (L), third average amount of time (O), and the fourth average amount of time (E);
         (viii) summing the first average amount of time per case ($W_A$) and the determined multiplied value in (vii) to determine the amount of time spent processing each case (W);
   determining a server demand prediction R, such that $$R = \frac{D}{Ta} \times R_{IN}(W_A + I(L + O + E))$$

where D is the duration of time and Ta is an amount of time available to work on cases;

comparing the server demand prediction based on the non-linearity per case (I) to an actual server allocation in the server farm;

in response to comparing the server demand prediction to the actual server allocation in the server farm, changing the actual server allocation to balance the actual server allocation to the server demand prediction.

8. The memory of claim 7, wherein a first particular case is processed by the server resource in more than one incident.

9. The memory of claim 8, wherein a second particular case is processed by the server resource in one incident.

10. The memory of claim 9, wherein determining the amount of time spent processing each case for the server (W) further comprises:
   determining the first average amount of time per case by averaging a second amount of time the server resource spends processing the first particular case and the second particular case.

11. The memory of claim 7, wherein changing the actual server allocation to balance the actual server allocation includes increasing the number of server resources when the recommended server allocation is greater than the actual server allocation.

12. The memory of claim 7, wherein changing the actual server allocation to balance the actual server allocation includes decreasing the number of server resources when the recommended server allocation is less than the actual server allocation.

13. An information handling system comprising:
   a memory device having machine-executable code stored therein; and
   a processor operable to execute the machine-executable code to:
   determine a case load for a server farm, wherein the case load includes a number of cases the server farm expects to process ($R_{IN}$) in a duration of time (D);
   determine an amount of time spent processing each case for a server in the server farm (W), wherein:
      the an amount of time spent processing each case (W) includes a number of cases that the server can process in the duration of time; and
      in determining the amount of time spent processing each case (W), the processor is further operable to execute code to:

(i) determine a first average amount of time per case that the server resource spends processing the cases ($W_A$);
(ii) determine a second average amount of time to list the previous incidents for each case (L);
(iii) determine a third average amount of time per case to open the previous incidents for each case (O);
(iv) determine a fourth average amount of time per case to read the previous incidents for each case (E);
(v) determine a non-linearity per case (I), representing an average number of incidents to fully process each case;
(vi) sum the second average amount of time to list the previous incidents for each case (L), the third average amount of time to open the previous incidents for each case (O), and the fourth average amount of time per case to read the previous incidents for each case (E);
(vii) multiply the non-linearity per case (I) with the summed value of the second average amount of time (L), third average amount of time (O), and the fourth average amount of time (E); and
(viii) sum the first average amount of time per case ($W_A$) and the determined multiplied value in (vii) to determine the amount of time spent processing each case (W);
determine a server demand prediction R, such that $$R = \frac{D}{Ta} \times R_{IN}(W_A + I(L + O + E))$$

where D is the duration of time and Ta is an amount of time available to work on cases;
subtract the server demand prediction from an actual server allocation in the server farm to determine a recommended server allocation;
store the recommended server allocation in the memory device; and
reallocate a server within the server farm based upon the recommended server allocation.

14. The information handling system of claim 13, wherein, in determining the amount of time spent processing each case (W) for the server, the processor is further operable to:
determine a first amount of time the server is available to work on cases; and
divide the first amount of time by the duration of time and by the average amount of time per case.

15. The information handling system of claim 14, wherein, in determining the average amount of time per case that the server spends processing the plurality of cases, the processor is further operable to sum:
a second amount of time the server spends processing the plurality of cases; and
a third amount of time the server spends preparing to work on the plurality of cases.

16. The information handling system of claim 14, wherein, in determining the third amount of time, the processor is further operable to:
multiply a first average number of touches to process the plurality of cases to;
the sum of:
the second average amount of time;
the third average amount of time; and
the fourth average amount of time.

* * * * *